(12) United States Patent
Yamada et al.

(10) Patent No.: US 6,545,650 B1
(45) Date of Patent: Apr. 8, 2003

(54) APPARATUS FOR THREE-DIMENSIONALLY DISPLAYING OBJECT AND METHOD OF DOING THE SAME

(75) Inventors: Keizo Yamada, Tokyo (JP); Toshihide Kuriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/338,588

(22) Filed: Jun. 23, 1999

(30) Foreign Application Priority Data

Jun. 23, 1998 (JP) .......................................... 10-175989

(51) Int. Cl.⁷ ................................................. G09G 5/00
(52) U.S. Cl. .................................. 345/7; 345/8; 348/52; 348/53
(58) Field of Search ........................... 345/7, 8, 9, 156; 351/201, 208, 209, 210; 348/51, 53, 115–116, 143, 169–170, 52, 78

(56) References Cited

U.S. PATENT DOCUMENTS

| | | | |
|---|---|---|---|
| 4,034,401 A | * 7/1977 | Mann | 348/115 |
| 5,825,456 A | 10/1998 | Tabata et al. | 351/201 |
| 6,072,443 A | * 6/2000 | Nasserbakht et al. | 345/7 |
| 6,201,517 B1 | * 3/2001 | Sato | 345/7 |

FOREIGN PATENT DOCUMENTS

| | | |
|---|---|---|
| JP | 62-115989 | 5/1987 |
| JP | 8-322004 | 12/1996 |
| JP | 9-247711 | 9/1997 |
| JP | 9-271043 | 10/1997 |
| JP | 9-322197 | 12/1997 |
| JP | 9-322199 | 12/1997 |

* cited by examiner

*Primary Examiner*—Dennis-Doon Chow
(74) *Attorney, Agent, or Firm*—Foley & Lardner

(57) ABSTRACT

There is provided an apparatus for three-dimensionally displaying an object, including (a) image-displaying devices which display images at an observer's eyes, (b) a beam scanner, (c) an area-identifier which detects a direction on which an observer turns at least one eye to thereby identify a display area at which the observer gazes, (d) a calculator which calculates, based on an image signal including parallax, a three-dimensional positional relation between the observer and an object to be observed, existing in the display area, (e) an image-position controller which controls positions of images so that the object is displayed in the display area at locations on lines connecting the object located at a three-dimensional position calculated by the calculator to centers of pupils of the observer, and (f) a convergence generator which generates a difference between first timing at which the beam scanner is driven and second timing at which images start being displayed in the image-displaying devices, in accordance with a degree of convergence, and varies positions of images to be displayed in the image-displaying devices, in accordance with the thus generated convergence. The apparatus can accomplish compatibility in parallax and convergence to thereby reduce fatigue in an observer's eyes.

17 Claims, 9 Drawing Sheets

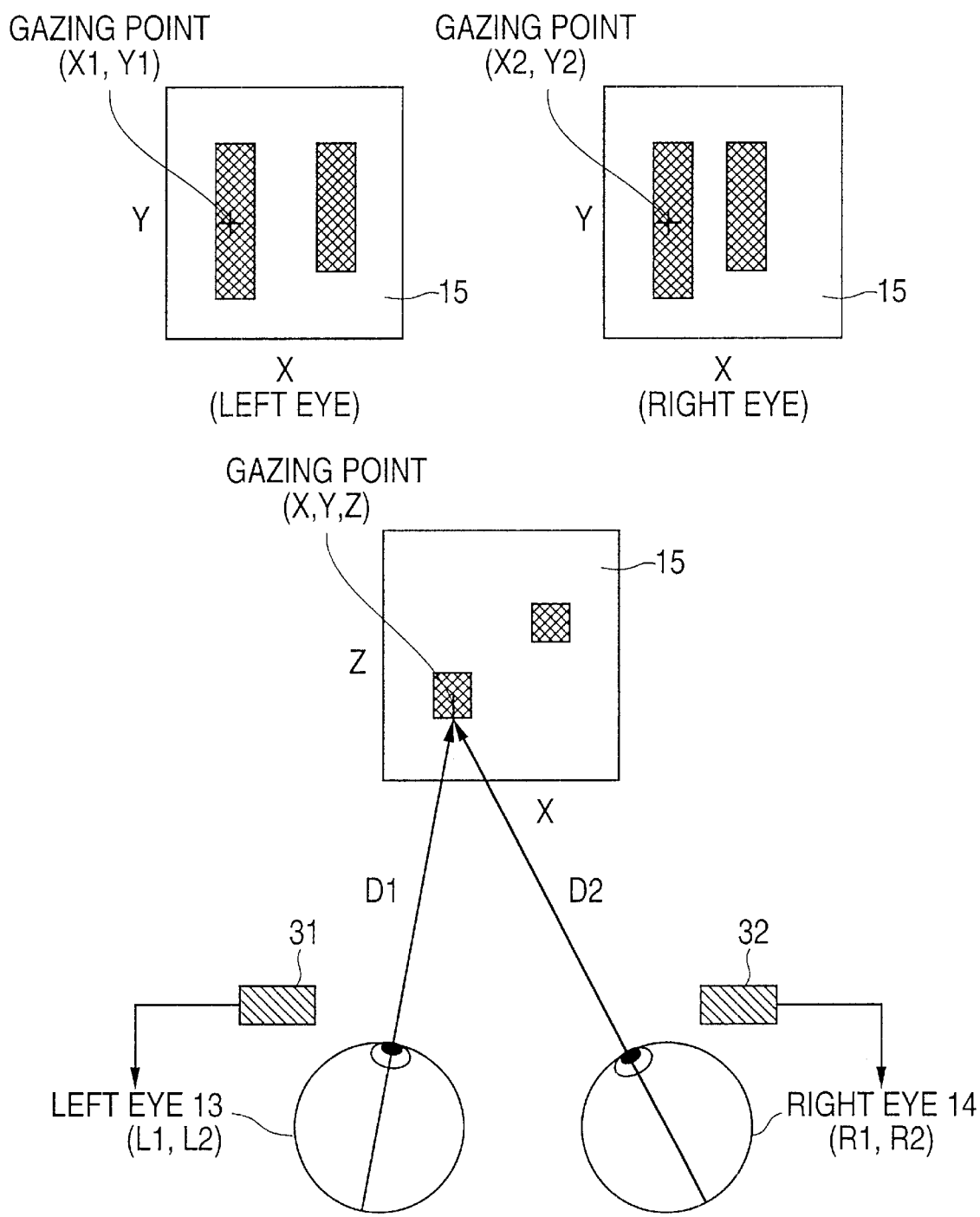

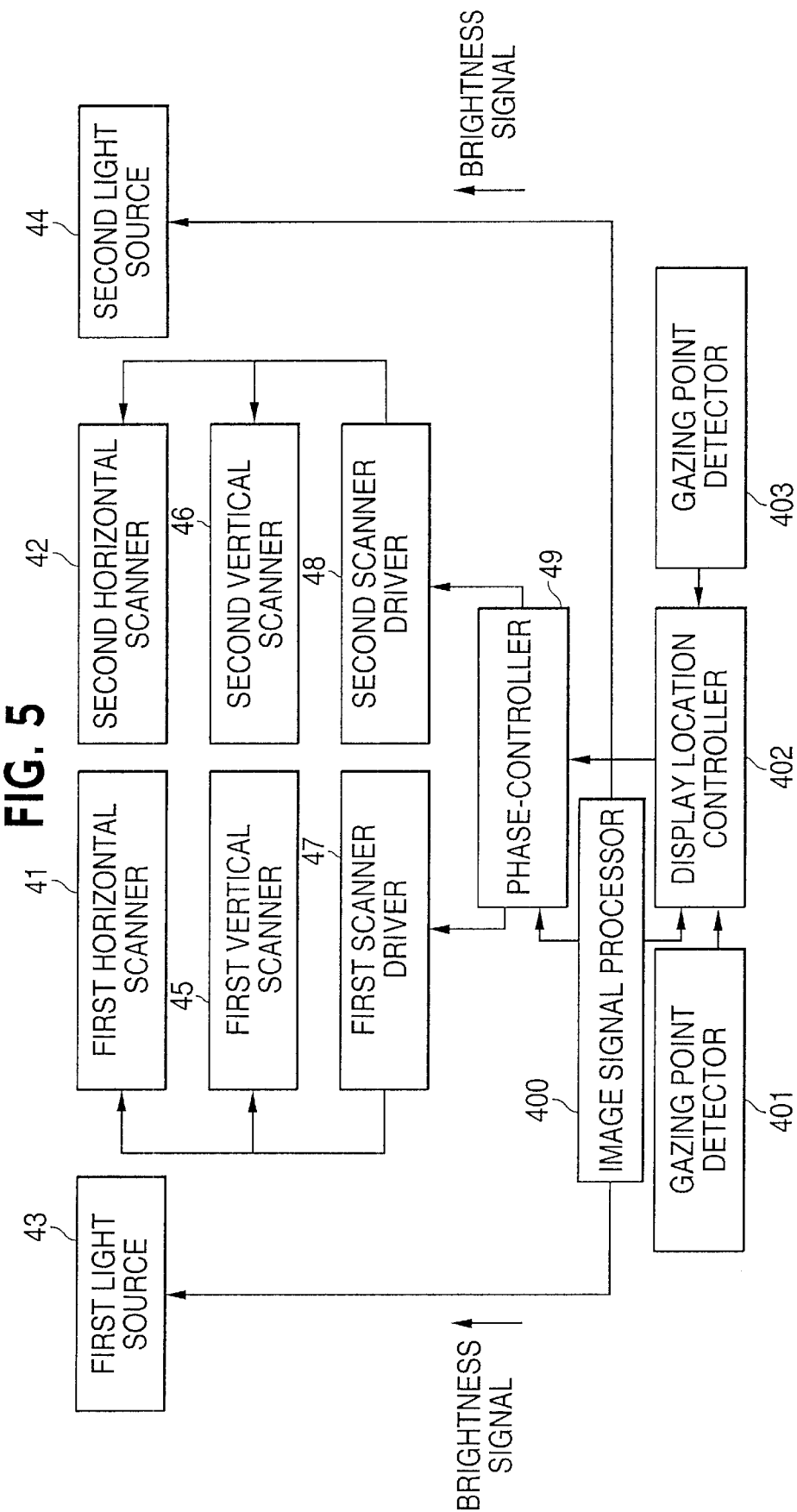

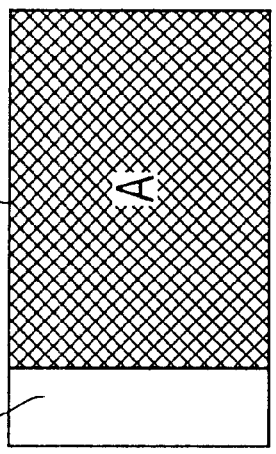
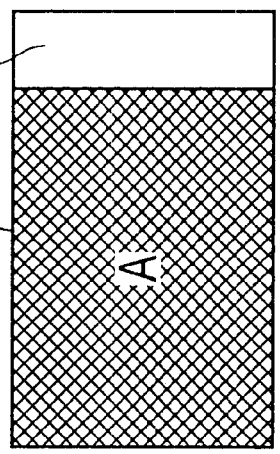
FIG. 6A
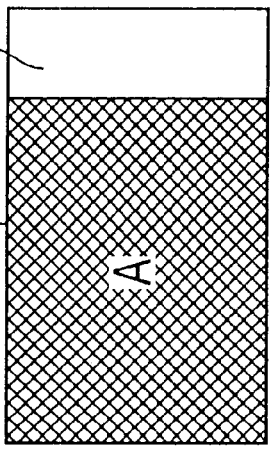
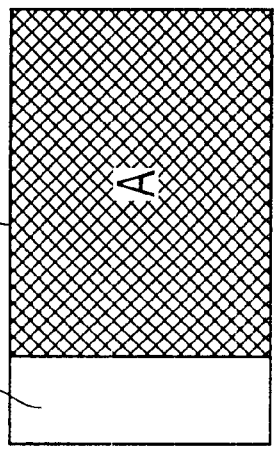
FIG. 6B

APPARATUS FOR THREE-DIMENSIONALLY DISPLAYING OBJECT AND METHOD OF DOING THE SAME

BACKGROUND OF THE INVENTION

1. Field of the Invention

The invention relates to an apparatus for three-dimensionally displaying an object by casting stereo-images on an observer's eyes, and also to a method of doing the same.

2. Description of the Related Art

Various apparatuses have been developed for three-dimensionally displaying an object. Three-dimensional display aims at reproduction of the same images as images obtained when a man observes an object, unlike planar display accomplished by a cathode ray tube (CRT). Three-dimensional display makes it possible to display an object approaching a spectator in a movie, or three-dimensionally grasp an object, which is difficult to grasp in a planar image.

Three-dimensional images we usually look at are established through focus control on which a distance to an object is reflected, convergence indicative of an angle formed by intersection between lines of sight of an observers eyes, and parallax indicative of a two-dimensional positional gap on images cast on observer's retinas.

A conventional apparatus for three-dimensionally displaying an object is usually comprised of two cameras and a device for reproducing images. The two cameras are spaced away from each other by 65 mm which is equal to an average distance between a man's eyes. In operation, stereo-images are taken by means of the two cameras, and the image-reproducing device casts images taken by the cameras on an observer's eyes. As a result, parallax is generated on retinas of an observer's eyes, and hence, three-dimensional display is accomplished.

FIG. 1 illustrates an example of a conventional apparatus for three-dimensionally displaying an object. The illustrated apparatus is comprised of a pair of image-displaying devices 101 located in front of an observer's eyes for focusing images on an observer's eyes, and a circuit 102 which provides image data to the image-displaying devices 101.

The image-displaying device 101 may be comprised of a cathode ray tube (CRT), a liquid crystal display, or a combination of an image-displaying device such as CRT and liquid crystal acting as a shutter. The image-displaying devices 101 form images in an observer's eyes, or display images for right and left eyes frame by fame, and separate them by a liquid crystal shutter into right and left eyes of an observer. As a result, the image-displaying devices 101 form images having parallax to thereby accomplish three-dimensional display, When an observer observes a three-dimensional object in actual space, the observer's eyes recognize parallax, and at the same time, convergence is generated in the observer's eyes in accordance with a distance between the observer and the object.

In a conventional method for accomplishing three-dimensional display by stereo-images, as mentioned above, two cameras positioned in parallel with each other are used, and images are taken so that they are focused on an object to be observed. Accordingly, convergence is coincident with parallax only when an observer observes an object which has been selected by the cameras as on-focus. Hence, if an observer who has observed only stereo-images so far observes an object other than objects having been selected as on-focus, a relation between parallax and convergence becomes quite different from a relation between parallax and convergence obtained when a three-dimensional object is observed in a usual three-dimensional space, resulting in a problem that coincidence cannot be made between images in the observer's eyes.

There have been suggested various apparatuses for three-dimensionally displaying an object, as well as the apparatus illustrated in FIG. 1.

Japanese Unexamined Patent Publication No. 7-167633 has suggested an apparatus for three-dimensionally displaying an object, wherein minimum parallax in an observer's eyes to an object is calculated, locations of reproduced images are calculated, and then, convergence points are determined so that the thus calculated locations of reproduced images are within a range of viewing angles of an observer's eyes, based on results of the calculations. Optical axes of cameras are controlled in accordance with the thus determined convergence points.

Japanese Unexamined Patent Publication No. 8-166559 has suggested an apparatus for three-dimensionally displaying an object, comprised of monitor devices monitoring movement of eye-balls of an observer, a display device for two-dimensionally displaying images, a mover which two-dimensionally the display device, a lens, a calculator which calculates a gazing point of an observer's eyes, based on the movement of eye-balls monitored by the monitor devices, and a controller which controls the mover to vary a location of the display device, based on the calculated gazing point.

Japanese Unexamined Patent Publication No. 8-211332 has suggested an apparatus for three-dimensionally displaying an object, which utilizes parallax of an observer's eyes. The apparatus is comprised of means for determining an appropriate convergence angle in reproduction of images, and a controller which controls locations of reproduced images, based on the thus determined convergence angle. The locations of reproduced images are controlled by controlling a location at which image data starts to be written in a liquid crystal display.

Japanese Unexamined Patent Publication No. 8-234141 has suggested an apparatus for three-dimensionally displaying an object, including liquid crystal displays for an observer's eyes Images having parallax are displayed in each of the liquid crystal displays to thereby accomplish three-dimensional display. In use, this apparatus is put around an observer's head. The apparatus is comprised of a device detecting a line of sight of at least one of an observers eyes, and determines a gazing point of an observer in an observing area, a image-processor which transmits an adjust signal by which a diopter is adjusted in dependence on parallax or convergence angle of images at the gazing point, and a motor for adjusting a diopter of the liquid crystal displays in accordance with the adjust signal.

Japanese Unexamined Patent Publication No. 9-218376 has suggested an apparatus for three-dimensionally displaying an object, comprising a distance calculator which calculates a distance to a gazing point, based on a convergence angle, a controller which determines a distance by and a direction in which image-displays and a focusing system are moved in order to move displayed images relative to an observer's eyes with a size of displayed images being kept constant, and a driver which moves the image-displays and the focusing system in accordance with the decision made by the controller.

Japanese Unexamined Patent Publication No. 10-48569 has suggested an apparatus for three-dimensionally displaying an object, comprising image-formers which form two images having parallax, on image-presentation planes, a monitor which detects movement of an observer's eye-balls to thereby obtain data about gazing point of the eye-balls on the image-presentation plane, a distance calculator which calculates a distance between the observer and an object located at the gazing point in images presented on the image-presentation plane, based on the data about gazing point, an adjuster which adjusts an convergence angle formed by lines of sight when the observer gazes at the object, based on the distance calculated by the calculator.

The above-mentioned conventional apparatuses for three-dimensionally displaying an object are common in that three-dimensional images are formed based almost only on parallax. If three-dimensional image is formed based only on parallax, it would be impossible to accomplish compatibility between parallax and convergence, which could be accomplished in natural observation. In general, since an observer does not always observe only on-focus locations, there is inevitable caused a problem that if an observer observers an object for a long time in the conventional method using stereo-images for three-dimensionally displaying an object, an observer's eyes would be very tired.

SUMMARY OF THE INVENTION

In view of the above-mentioned problem in the conventional methods and apparatuses, it is an object of the present invention to provide an apparatus for three-dimensionally displaying an object, which is capable of accomplishing compatibility between parallax and convergence to thereby avoid an observer's eyes from being tired. It is also an object of the present invention to provide a method of three-dimensionally displaying an object, which is capable of doing the same.

In one aspect of the present invention, there is provided an apparatus for three-dimensionally displaying an object, including (a) an area-identifier which detects a direction on which an observer turns at least one eye to thereby identify a display area at which the observer gazes, (b) a calculator which calculates, based on an image signal including parallax, a three-dimensional positional relation between the observer and an object to be observed, existing in the display area, and (c) an image-position controller which controls positions of images so that the object is displayed in the display area at locations on lines connecting the object located at a three-dimensional position calculated by the calculator, to centers of pupils of the observer.

In accordance with the above-mentioned apparatus, a three-dimensional distance is first determined between an observer and an object observed by the observer, based on information about parallax of the object and an interval between cameras. The used information about parallax is one of image information which is stereo-recorded by the cameras in the interval and certain convergence, and is displayed in the observer's eyes. Then, the thus determined three-dimensional distance is divided by a distance between the observer's eyes to thereby determine convergence which is to be generated when an observer looks at the object. Then, positions of images cast on the observer's eyes are controlled in such a manner that convergence becomes equal to the convergence having been determined in the step (b).

A person's eyes can receive much image-information therein. However, when eyes are focused on a common focusing point, a person can observe images, with high resolution merely within a maximum viewing angle of about 4 degrees. That is, though an area beyond a maximum viewing angle of about 4 degrees occupies almost all information received in an observer's eyes, pixels displayed in such an area is fuzzy.

If convergence and parallax are coincident with each other at a gazing point, a person observing stereo-images can experience convergence associated with parallax, and hence, does not feel a sense of incompatibility between parallax and convergence unlike a conventional method or apparatus. As a result, the apparatus in accordance with the present invention makes it possible to much reduce an observer's fatigue in observation of three-dimensional images.

It is preferable that the apparatus further includes an area-indicator which indicates a part of a displayable area as the display area and disallows an area in the displayable area other than the thus indicated display area to be displayed, in which case, the area is preferably located internally of an area in which there is displayed an image associated with convergence obtained when the observer looks at a point at infinity.

It is preferable that the display area is moved by inserting blank signals into original images at a right edge of the third area for a right eye of the observer and at a left edge of the third area for a left eye of the observer, the blank signals corresponding to an amount of horizontally moving pixel.

It is preferable that the image-position controller controls a position of an image so that parallax is zero at a center of each of retinas of an observer's eyes associated with a gazing point.

There is further provided an apparatus for three-dimensionally displaying an object, including (a) image-displaying devices which display images at an observer's eyes, (b) a beam scanner, (c) an area-identifier which detects a direction on which an observer turns at least one eye to thereby identity a display area at which the observer gazes, (d) a calculator which calculates, based on an image signal including parallax, a three-dimensional positional relation between the observer and an object to be observed, existing in the display area, (e) an image-position controller which controls positions of images so that the object is displayed in the display area at locations on lines connecting the object located at a three-dimensional position calculated by the calculator, to centers of pupils of the observer, and (f) a convergence generator which generates a difference between first timing at which the beam scanner is driven and second timing at which images start being displayed in the image-displaying devices, in accordance with a degree of convergence, and varies positions of images to be displayed in the image-displaying devices, in accordance with the thus generated convergence.

For instance, the convergence generator may be comprised of a memory storing addresses associated with positions of images displayed in the image-displaying devices, and a blank information writer which writes blank information into the memory, the blank information being information based on which a beam would not be generated, even if read out, in which case, the image-position controller indicates quantity and position of the blank information to the blank information writer.

There is still further provided an apparatus for three-dimensionally displaying an object, including (a) image-displaying devices which display images at an observer's eyes, (b) a beam scanner including a scanning mirror for forming an image, (c) an area-identifier which detects a direction on which an observer turns at least one eye to thereby identify a display area at which the observer gazes, (d) a calculator which calculates, based on an image signal including parallax, a three-dimensional positional relation between the observer and an object to be observed, existing in the display area, (e) an image-position controller which controls positions of images so that the object is displayed in the display area at locations on lines connecting the object located at a three-dimensional position calculated by the calculator, to centers of pupils of the observer, and (f) a horizontally movable mirror which varies positions of images displayed by the image-displaying devices, in accordance with convergence.

For instance, the horizontally movable mirror may be located just at the rear of the scanning mirror.

It is preferable that the horizontally movable mirror is designed to be able to incline relative to an optical axis of the scanning mirror.

In another aspect of the present invention, there is provided a method of three-dimensionally displaying an object, including the steps of (a) determining a three-dimensional distance between an observer and an object observed by the observer, based on information about parallax of the object and an interval between cameras, the information about parallax being one of image information which is stereorecorded with the interval and certain convergence, and is displayed in the observer's eyes, (b) dividing the three-dimensional distance by a distance between the observer's eyes to thereby determine convergence which is to be generated when an observer looks at the object, and (c) controlling positions of images cast on the observer's eyes so that convergence becomes equal to the convergence having been determined in the step (b).

There is further provided a method of three-dimensionally displaying an object, including the steps of (a) detecting a direction on which an observer turns at least one eye to thereby identify a display area at which the observer gazes, (b) calculating a three-dimensional positional relation between the observer and an object to be observed, existing in the display area, and (c) controlling positions of images so that the object is displayed in the display area at locations on lines connecting the object located at a three-dimensional position calculated in the step (b), to centers of pupils of the observer.

It is preferable that a part of a displayable area is indicated as the display area in the step (a), and that an area in the displayable area other than the thus indicated display area is disallowed to be displayed, in which case, the area is preferably located internally of an area in which there is displayed an image associated with convergence obtained when the observer looks at a point at infinity.

It is preferable that the display area is moved by inserting blank signals into original images at a right edge of the third area for a right eye of the observer and at a left edge of the third area for a left eye of the observer, the blank signals corresponding to an amount of horizontally moving pixel.

It is preferable that the positions of images are controlled so that parallax is zero at a center of each of retinas of an observer's eyes associated with a gazing point.

There is still further provided a method of three-dimensionally displaying an object, including the steps of (a) detecting a direction on which an observer turns at least one eye to thereby identify a display area at which the observer gazes, (b) calculating a three-dimensional positional relation between the observer and an object to be observed, existing in the display area, (c) controlling positions of images so that the object is displayed in the display area at locations on lines connecting the object located at a three-dimensional position calculated in the step (b), to centers of pupils of the observer, and (d) generating a difference between first timing at which beam scanning is started and second timing at which images start being displayed, in accordance with a degree of convergence, and varying positions of images in accordance with the thus generated convergence.

In accordance with the present invention, a relation between parallax and convergence is identical with the same obtained when a person actually observes an object. Hence, a person would not be tired regardless of observation of three-dimensional images for a long time.

In accordance with the apparatus including the beam scanner, since positions of images in right and left eyes can be varied merely by controlling timing at which the scanner starts to be driven and timing at which images start to be displayed, it would be possible to readily accomplish convergence.

Since the apparatus including the beam scanner does not have fixed dots unlike CRT and LCD, it would be possible to successively vary positions of images, that is, a degree of convergence. Hence, even when fluctuation in parallax is quite small, it would be possible to provide appropriate convergence accordingly.

Even when a liquid crystal display is used as the image-display device, convergence could be readily accomplished by confining a display area to a part of a displayable area of the liquid crystal display, and scrolling the thus confined display area horizontally and/or vertically.

The horizontally movable mirror may be located in front of a liquid crystal display, which would provide the same advantages as those obtained by the apparatus for three-dimensionally displaying an object, including a liquid crystal display.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 4 illustrates an example of a detector for detecting a gazing point.

FIG. 5 is a block diagram of a convergence generating circuit constituting a part of the apparatus for three-dimensionally displaying an object.

FIGS. 6A and 6B show relations between convergence and locations at which images are displayed.

DESCRIPTION OF THE PREFERRED EMBODIMENTS

First Embodiment

Figure 1:
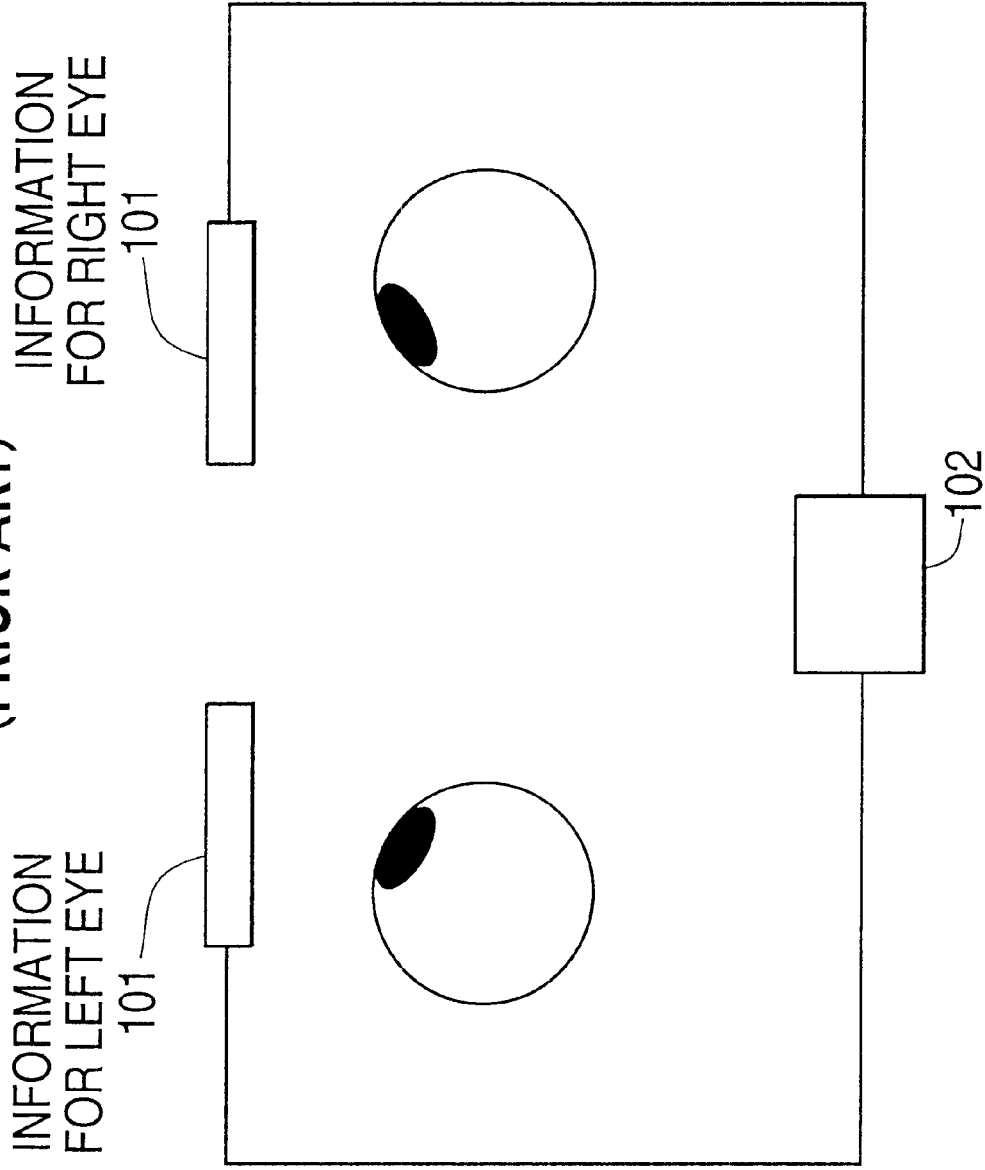
FIG. 1 is a block diagram of an example of a conventional apparatus for three-dimensionally displaying an object.
Figure 2:
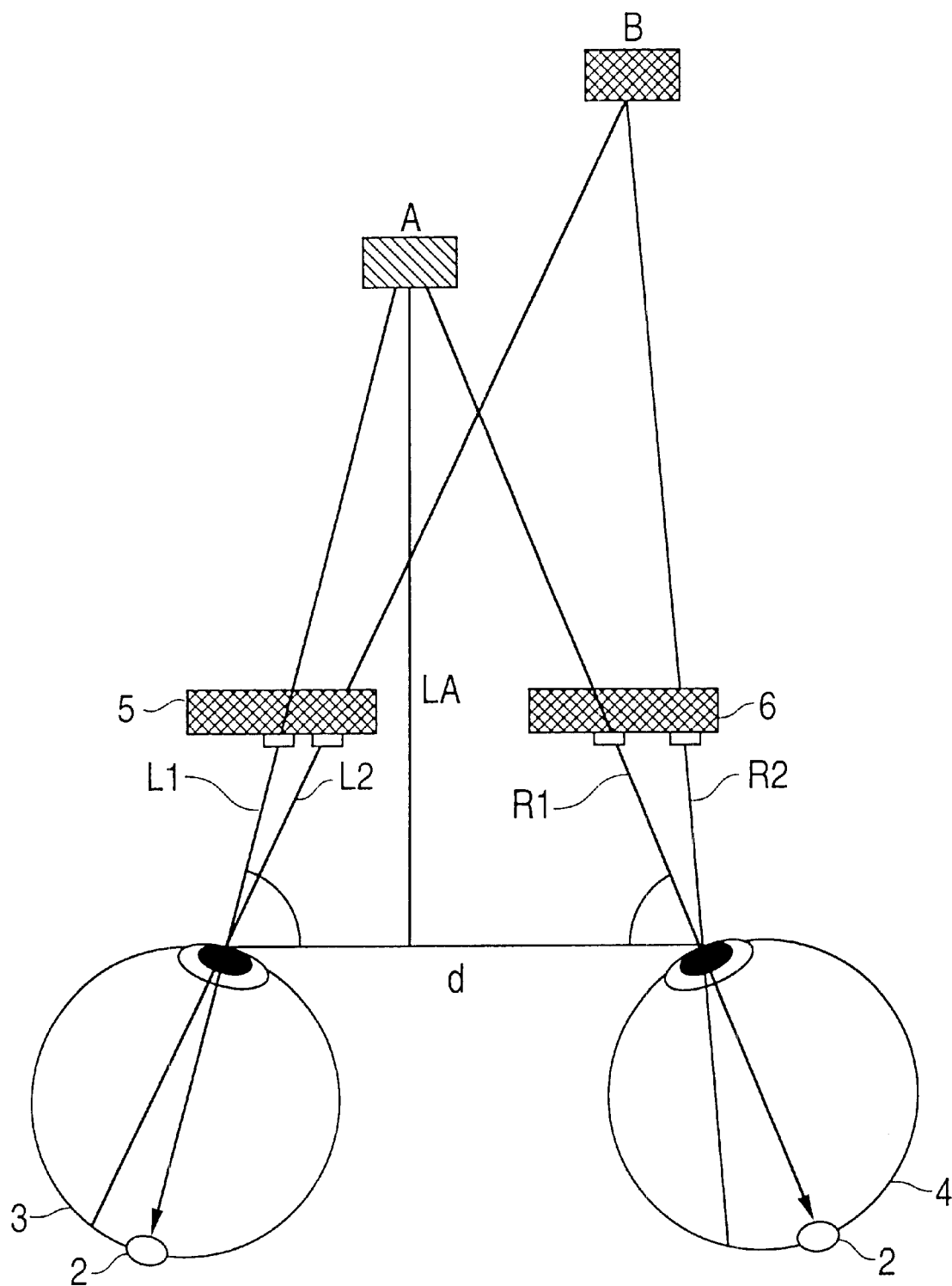
FIG. 2 illustrates an apparatus for three-dimensionally displaying an object, in accordance with the first embodiment.
Figure 3:
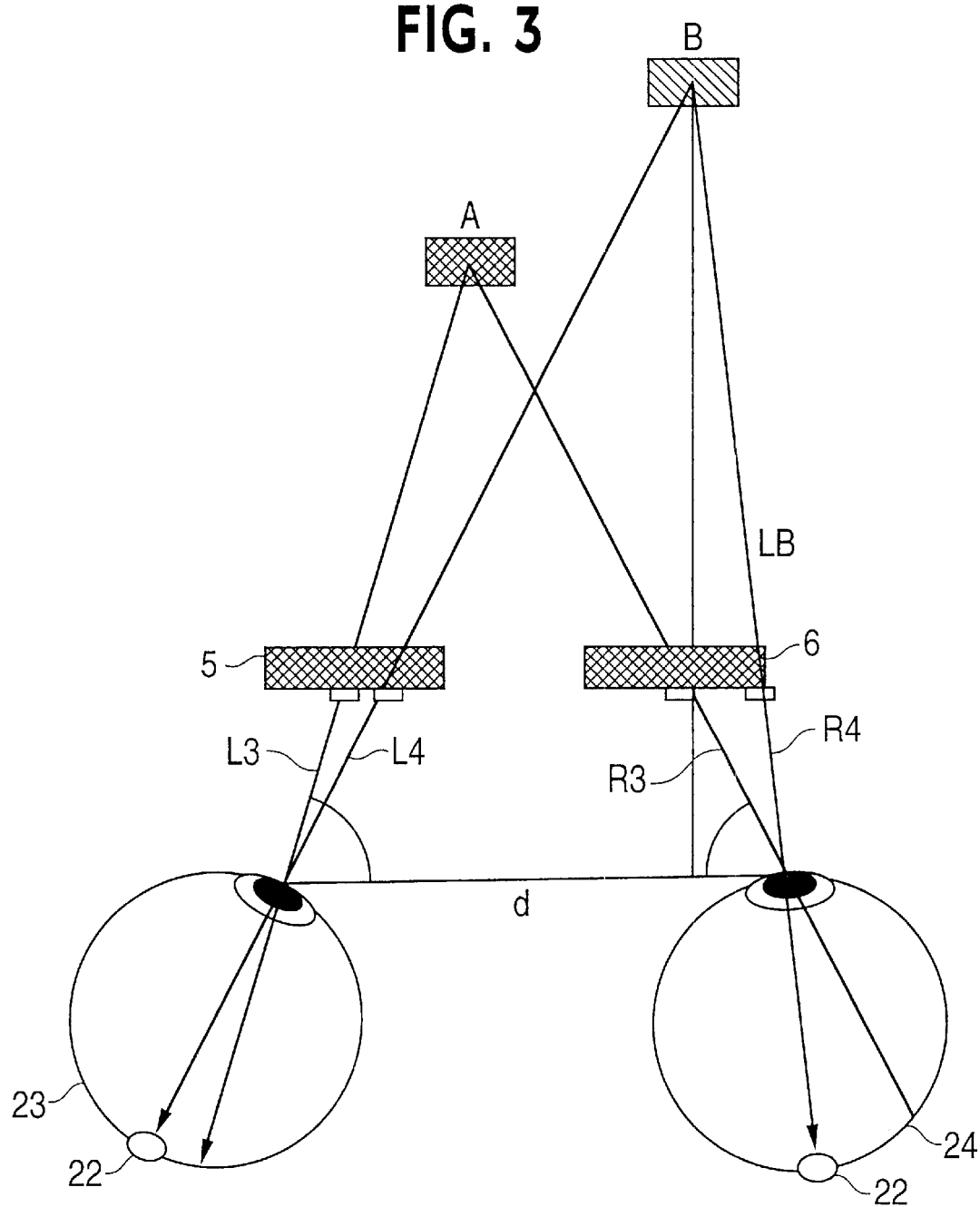
FIG. 3 illustrates an apparatus for three-dimensionally displaying an object, in accordance with the first embodiment.

FIGS. 2 and 3 illustrate how locations at which images are displayed vary in accordance with variation of a gazing point in an apparatus for three-dimensionally displaying an object, in accordance with the first embodiment.

The apparatus includes devices 5 and 6 for displaying images, for left and right eyes 3 and 4, respectively. A gazing point of an observer is located at A or B.

In the first embodiment, when the gazing point is located at A, as illustrated in FIG. 2, images for the left eye 3 are formed at the image-display device 5 on a line L1 connecting the gazing point A to a center 2 of retina of the left eye 8, and images for the right eye 4 are formed at the image-display device 6 on a line R1 connecting the gazing point A to a center 2 of retina of the right eye 4.

Similarly, when the gazing point is located at B, as illustrated in FIG. 3, images for a left eye 23 are formed at the image-display device 5 on a line L4 connecting the gazing point B to a center 22 of retina of the left eye 23, and images for a right eye 24 are formed at the image-display device 6 on a line R4 connecting the gazing point B to a center 22 of retina of the right eye 24.

As is obvious in view of FIGS. 2 and 3, in accordance with the first embodiment, images are positioned so that parallax is equal to zero at the centers 2 and 22 of retinas in the eyes 3, 4, 23 and 24 directing the gazing points A and 13

In order to establish convergence in accordance with a gazing point, it is necessary to extract parallax which images at a gazing point supply to eyes of an observer, from image data. A pair of cameras used for three-dimensionally displaying an object is usually horizontally installed. Accordingly, a particular pixel of an object caught by the right camera is found somewhere in a scanning line, if the scanning line is horizontally scanned to the left. Accordingly, it would be possible to increase a process rate by extracting corresponding points by pattern-matching, based on right and left images existing on a common scanning line, and calculating both a gap between the points and a standard coordinate system and a magnification of images to thereby obtain parallax.

After parallax is obtained, a distance in three-dimensional space between an observer and an object to be observed, that is, the gazing point is calculated.

Then, taking the thus calculated distance into consideration, images are moved horizontally on the image-display devices 5 and 6 so that images at the gazing point are displayed in the retina centers 2 or 22.

FIG. 4 illustrates an example of a gazing point detector.

The illustrated gazing point detector is comprised of a first gazing point detector 31 for a left eye 13 having coordinate values (L1, L2) and a second gazing point detector 32 for a right eye 14 having coordinate values (R1, R2). The first and/or second gazing point detectors 31 and 32 determine a gazing point (X1, Y1) and/or a gazing point (X2, Y2) existing on a plane 15 defined by images output by an image output device (not illustrated), for at least one of the left and right eyes 13 and 14.

Since a gazing point can be detected as a location at which a normal line of a pupil intersects with a display screen, a gazing point can be detected by detecting a location of a pupil. The gazing point detector may be comprised in various ways. In general, a location of a pupil can be detected, utilizing the fact that reflectivity of infra-red rays for a pupil is quite different from the same for an eye other than a pupil.

For instance, if an eye to which near infrared rays emitted from an infrared emitting diode are directed is observed by means of a charge coupled device (CCD) camera, a pupil is observed white. Hence, it would be possible to determine gazing points of eyes by tracing a pattern of a white area.

As an alternative, a gazing point can be detected by directing infra-red rays to eyes, and directly detecting a location at which the infra-red rays are reflected, by means of a diode array which detects infra-red rays, or PSD.

A gazing point can be detected also by means of an electro-myographic signal. As a line of sight moves, muscles of eye-balls and others are activated accordingly. At that time, there is generated bioelectric current (EOG) in muscles. It is possible to determine locations of pupils by measuring EOG. Since the thus determined locations of pupils are indicative of relative variation in pupil's location, the locations are converted into locations of particular pixels on two-dimensional images actually observed by an observers eyes, by carrying out Off-set removal and through the use of a conversion table.

FIG. 5 is a block diagram of a circuit for generating convergence. The circuit is comprised of first and second light sources 43 and 44 which emit a light in synchronization of an image signal, first and second horizontal scanners 41 and 42 which horizontally scan a light emitted from the first and second light sources 42 and 43, respectively in raster fashion, first and second vertical scanners 45 and 46 which vertically scan a light emitted from the first and second light sources 42 and 43, respectively, in raster fashion, a first scanner driver 47 which drives the first horizontal scanner 41 and the first vertical scanner 45, a second scanner driver 48 which drives the second horizontal scanner 42 and the second vertical scanner 46, and an image signal processor 400 which displays images in synchronization with the first and second horizontal scanners 41 and 42, and the first and second vertical scanners 45 and 46.

In the apparatus in accordance with the first embodiment, there is generated a difference between a timing at which the scanners are driven and a timing at which images are displayed, to thereby vary locations at which images are displayed. In order to vary such locations, the circuit is provided with means for varying a location at which an image is displayed, comprising a phase-controller 49 which controls phases of signals by which the first and second horizontal scanners 41 and 42 are driven, gazing point detectors 401 and 403 positioned for an observer's eyes, and a display location controller 402 which converts gazing points into data about locations at which images are displayed.

In accordance with the means for varying a location at which an image is displayed, a timing at which the first and second horizontal scanners 41 and 42 are driven, relative to a horizontal scanner synchronization signal, is varied in accordance with convergence, and thus, there is generated a difference between a timing at which the scanners are driven and a timing at which images are displayed. As a result, a location at which an image is displayed is varied.

FIG. 6 illustrates a relation between convergence and a location at which an image is displayed. When an observer observes an object located near the observer, there is generated great convergence. In such a case, as illustrated in FIG. 6B, a phase is advanced in the first horizontal scanner 41 associated with a left eye of an observer, and a phase is delayed in the second horizontal scanner 42 associated with a right eye of an observer. As a result, an image is displayed such that the image is located inside both left and right eyes. That is, areas 501 in which images are displayed are located in front of left and right eyes of an observer, and blank areas 502 are located outside left and right eyes of an observer.

On the other hand, when an observer observes a point of infinity, convergence is smallest. In such a case, as illustrated in FIG. 6A, there is carried out such phase control that areas in which images are displayed are located so that lines of sight of left and right eyes are in parallel with each other. That is, blank areas 502 are located inside left and right eyes of an observer, and areas 501 in which images are displayed are located in front of left and right eyes of an observer.

Figure 7:
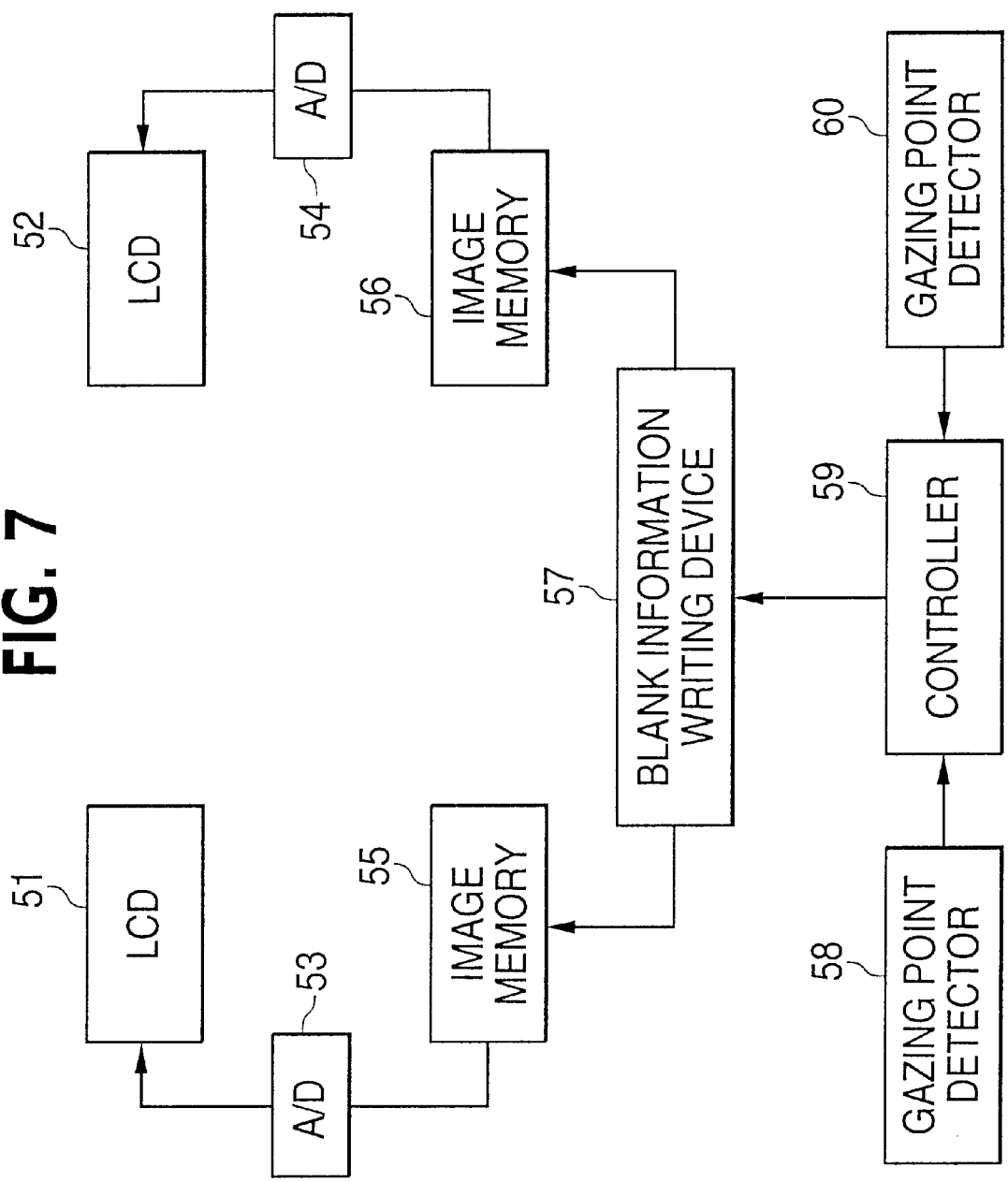
FIG. 7 is a block diagram of a convergence generating circuit including a liquid crystal display.

FIG. 7 is a block diagram of a convergence generator used in an apparatus of three-dimensionally displaying an object, in which devices 51 and 52 of displaying images are comprised of a liquid crystal display. When a liquid crystal display is used as the image-display devices 51 and 52, a location at which an image is displayed may be varied in various ways. Hereinbelow is explained an example where a location at which an image is displayed is varied by image data stored in a memory is move in a block, and blank information is written into a memory.

The convergence generator illustrated in FIG. 7 is comprised of first and second devices 51 and 52 each comprised of a liquid crystal display device for displaying images therein, first and second memories 55 and 56 storing therein addresses associated with locations of images displayed in the first and second image-display devices 51 and 52, first and second A/D converters 53 and 54 converting analog data transmitted from the image memories 55 and 56, into digital data, and transmitting the thus converted digital data to the first and second image-display devices 51 and 52, a device 57 for writing blank information into the image memories 55 and 56, gazing point detectors 58 and 60 positioned for left and right eyes of an observer, a controller 59 converting gazing points into data about a location at which an image is displayed, and transmitting the thus converted data into the blank information writing device 57.

Herein, blank information is information based on which a beam would not be generated, even if read out.

In a liquid crystal display device, a location for display is directly associated with an address of a memory. Hence, it is necessary to vary a location at which a memory stores image data, in order to vary a location at which an image is displayed. Image information is stored in the first and second image memories 55 and 56 as a pixel indicated with two coordinate values in horizontal and vertical directions. Hence, it would be possible to vary a location at which an image is displayed, by in advance increasing or decreasing off-set to an address of the memories in accordance with convergence, and then, writing data into or reading data out of the memories.

Figure 8A:
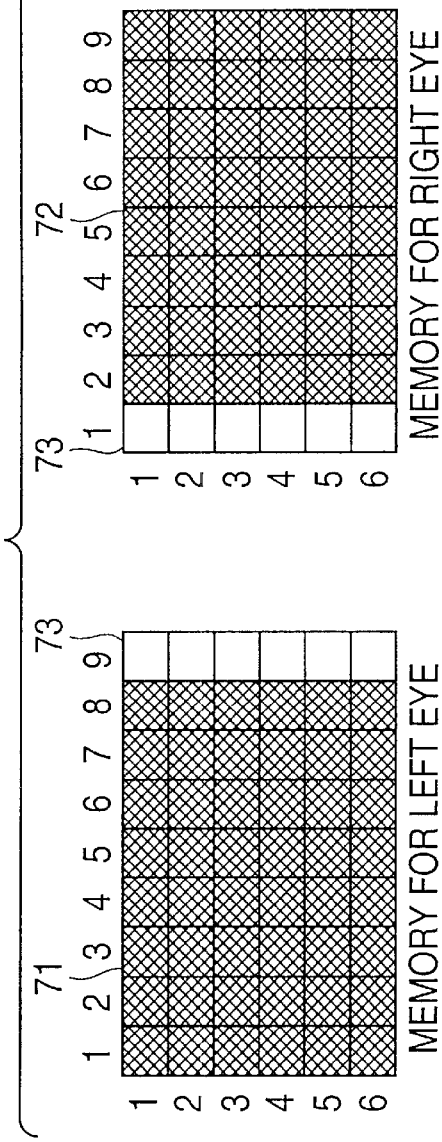
FIGS. 8A and 8B illustrate what is stored in memories.
Figure 8B:
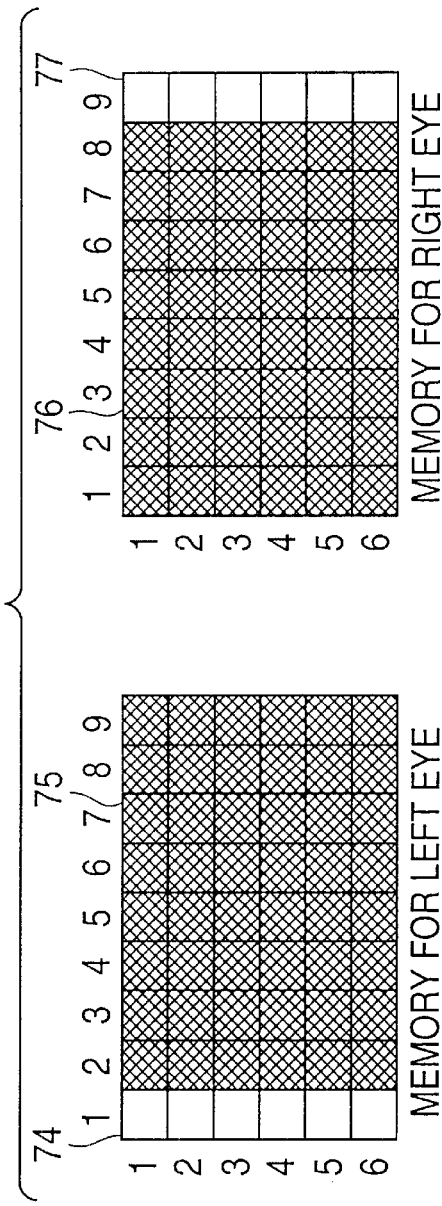

FIGS. 8A and 8B illustrate contents of the fist and second memories 55 and 56.

Blank information 73, 74 and 77 which would not emit a light, even if read out of a memory, is written into an area other than an area into which information 71, 72, 75 and 76 about images to be displayed is written. The blank information 73, 74 and 77 are displayed in the first and second image-display devices 51 and 52 with such a positional relation between the blank information 73, 74, 77 and the image information 71, 72, 75, 76 as illustrated in FIGS. 8A and 8B being kept as it is.

FIG. 8A illustrates information to be read out of the memories 65 and 56 when an observer observes an object located relatively far from the observer, that is, when convergence is relatively small The blank information 73 is written into the memories 55 and 56 at areas located inside left and right eyes of an observer. The information about images 71 and 72 are written into the memories 55 and 56 in an area other than the blank information 73.

FIG. 8B illustrates information to be read out of the memories 55 and 56 when an observer observes an object located relatively near the observer, that is, when convergence is relatively great. The blank information 74 and 77 are written into the memories 55 and 56 at areas located outside left and right eyes of an observer. The information about images 75 and 76 are written into the memories 55 and 56 in an area inside the blank information 74 and 77.

Quantity and location of the blank information 73, 74 and 77 to be written into the memories 55 and 56 are controlled as follows. The controller 59 makes calculation, based on data transmitted from the gazing point detectors 58 and 60. The controller 59 transmits the calculation result to the blank information writing device 57, which in turn inserts the blank information 73, 74 and 77 into the memories 55 and 56 in accordance with the calculation result. Thus, the blank information 73, 74 and 77 are controlled as to quantity to be written into the memories 55 and 66, and location at which the blank information is written into the memories 55 and 66.

In accordance with the embodiment, images can be horizontally shifted dot by dot which is a resolution of the image-display devices 51 and 52 In being shifted, the displayed images are merely scrolled, and hence, are not changed in their contents.

Second Embodiment

Figure 9:
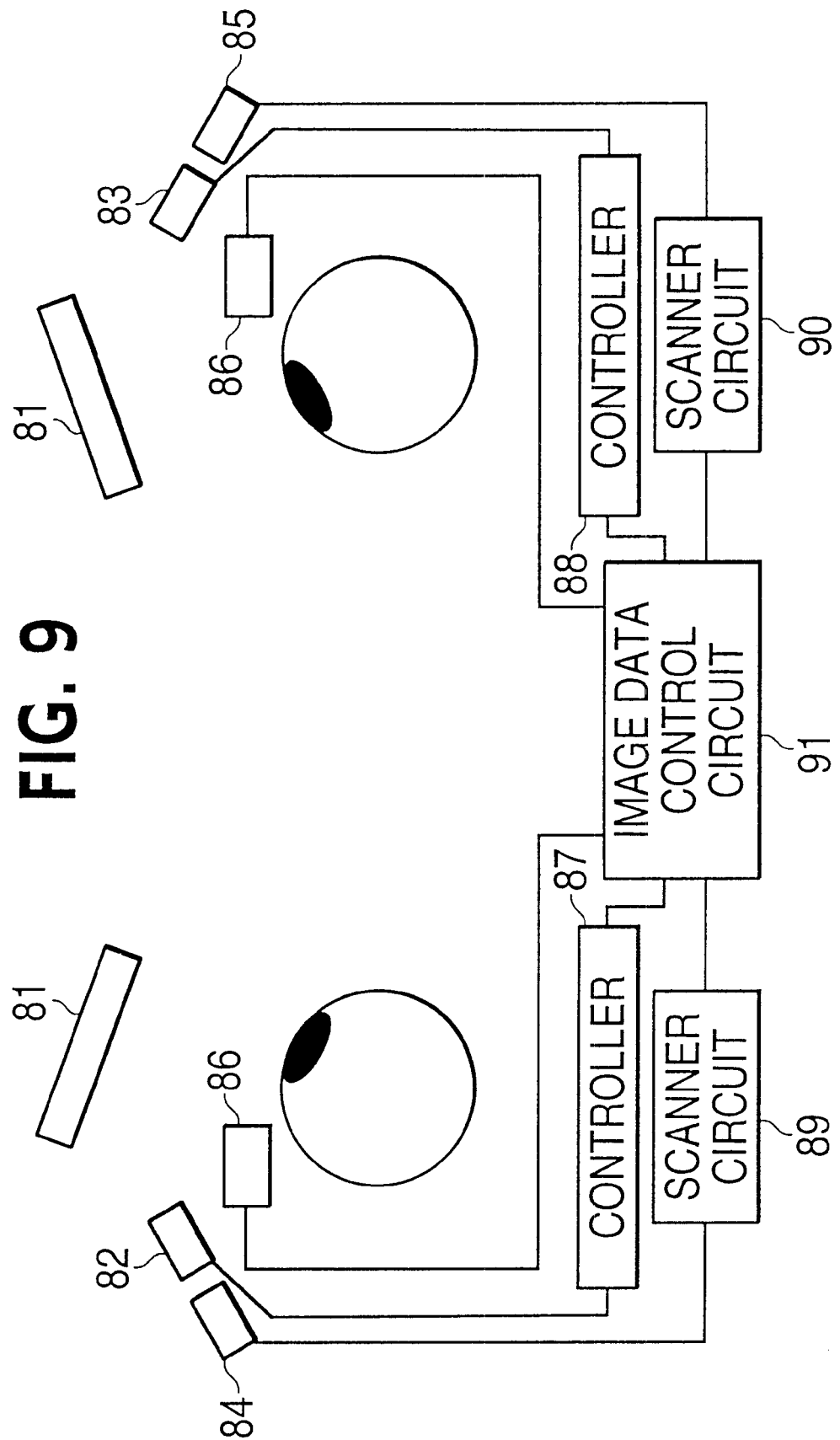
FIG. 9 is a block diagram of an apparatus for three-dimensionally displaying an object, in accordance with the second embodiment.

FIG. 9 illustrates an apparatus for three-dimensionally displaying an object, in accordance with the second embodiment.

The apparatus is comprised of a pair of detectors 86 for detecting lines of sight of left and right-eyes of an observer, first mirrors 84 and 85 positioned in the vicinity of left and right eyes of an observer for optically scanning, second mirrors 82 and 83 located adjacent to the first mirrors 84 and 85 for moving images, a pair of reflection mirrors 81 which reflect beams coming from the first and second mirrors 84, 85, 82, 83 into left and right eyes of an observer, scanner circuits 89 and 90 which controls optical scan carried out by the first mirrors 84 and 85, a pair of controllers 87 and 88 which controls a distance by which images are moved by the second mirrors 82 and 83, and an image data control circuit 91 which supplies control data to the controllers 87 and 88, and scanner circuits 89 and 90.

The apparatus in accordance with the second embodiment is provided with the second mirrors 82 and 83 which horizontally moves images. The second mirrors 82 and 83 are fixed separately from the first mirrors 84 and 85, and a location at which the second mirrors 82 and 83 are fixed is determined in accordance with convergence.

The second mirrors 82 and 83 are designed to be able to incline relative to optical axes of the first mirrors 84 and 85. When the second mirrors 82 and 83 are inclined, locations at which images are displayed are varied.

The second mirrors 82 and 83 are located just at the rear of the first mirrors 84 and 85 along the optical axes of the first mirrors 84 and 85. Data about locations of left and right eyes of an observer is transmitted from the detectors 86 to the controllers 87 and 88 through the image data control circuit 91. The controllers 87 and 88 determines locations of the second mirrors 82 and 83 in accordance with control data transmitted from the image data control circuit 91.

While the present invention has been described in connection with certain preferred embodiments, it is to be understood that the subject matter encompassed by way of the present invention is not to be limited to those specific embodiments. On the contrary it is intended for the subject matter of the invention to include all alternatives, modifications and equivalents as can be included within the spirit and scope of the following claims The entire disclosure of Japanese Patent Application No. 10-175989 filed on Jun. 23, 1998 including specification, claims, drawings and summary is incorporated herein by reference in its entirety.

What is claimed is:

1. An apparatus for three-dimensionally displaying an object, comprising:
   (a) an area-identifier which detects a direction on which an observer turns at least one eye to thereby identify a display area at which said observer gazes;
   (b) a calculator which calculates, based on an image signal including parallax, a three-dimensional positional relation between said observer and an object to be observed, existing in said display area;
   (c) an image-position controller which controls positions of images so that said object is displayed in said display area at locations on lines connecting said object located at a three-dimensional position calculated by said calculator, to centers of pupils of said observer; and
   (d) an area-indicator which indicates a part of a displayable area as said display area and disallows an area in said displayable area other than the thus indicated display area to be displayed.

2. The apparatus as set forth in claim 1, wherein said area is located internally of an area in which there is displayed an image associated with convergence obtained when said observer looks at a point at infinity.

3. The apparatus as set forth in claim 1, wherein said display area is moved by inserting blank signals into original images at a right edge of said third area for a right eye of said observer and at a left edge of said third area for a left eye of said observer, said blank signals corresponding to an amount of horizontally moving pixel.

4. An apparatus for three-dimensionally displaying an object, comprising:
   (a) an area-identifier which detects a direction on which an observer turns at least one eye to thereby identify a display area at which said observer gazes;
   (b) a calculator which calculates, based on an image signal including parallax, a three-dimensional positional relation between said observer and an object to be observed, existing in said display area;
   (c) an image-position controller which controls positions of images so that said object is displayed in said display area at locations on lines connecting said object located at a three-dimensional position calculated by said calculator, to centers of pupils of said observer; and
   (d) wherein said image-position controller controls a position of an image so that parallax is zero at a center of each of retinas of an observer's eyes associated with a gazing point.

5. An apparatus for three-dimensionally displaying an object, comprising:
   (a) image-displaying devices which display images at an observer's eyes;
   (b) a beam scanner;
   (c) an area-identifier which detects a direction on which an observer turns at least one eye to thereby identify a display area at which said observer gazes;
   (d) a calculator which calculates, based on an image signal including parallax, a three-dimensional positional relation between said observer and an object to be observed, existing in said display area;
   (e) an image-position controller which controls positions of images so that said object is displayed in said display area at locations on lines connecting said object located at a three-dimensional position calculated by said calculator, to centers of pupils of said observer; and
   (f) a convergence generator which generates a difference between first timing at which said beam scanner is driven and second timing at which images start being displayed in said image-displaying devices, in accordance with a degree of convergence, and varies positions of images to be displayed in said image-displaying devices, in accordance with the thus generated convergence.

6. The apparatus as set forth in claim 5, wherein said convergence generator is comprised of a memory storing addresses associated with positions of images displayed in said image-displaying devices, and a blank information writer which writes blank information into said memory, said blank information being information based on which a beam would not be generated, even if read out,
   and wherein said image-position controller indicates quantity and position of said blank information to said blank information writer.

7. The apparatus as set forth in claim 5, wherein said image-position controller controls a position of an image so that parallax is zero at a center of each of retinas of an observer's eyes associated with a gazing point.

8. An apparatus for three-dimensionally displaying an object, comprising;
   (a) image-displaying devices which display images at an observer's eyes;
   (b) a beam scanner including a scanning mirror for forming an image;
   (c) an area-identifier which detects a direction on which an observer turns at least one eye to thereby identity a display area at which said observer gazes;
   (d) a calculator which calculates, based on an image signal including parallax, a three-dimensional positional relation between said observer and an object to be observed, existing in said display area;
   (e) an image-position controller which controls positions of images so that said object is displayed in said display area at locations on lines connecting said object located at a three-dimensional position calculated by said calculator, to centers of pupils of said observer; and
   (f) a horizontally movable mirror which varies positions of images displayed by said image-displaying devices, in accordance with convergence.

9. The apparatus as set forth in claim 8, wherein said horizontally movable mirror is located just at the rear of said scanning mirror.

10. The apparatus as set forth in claim 8, wherein said horizontally movable mirror is designed to be able to incline relative to an optical axis of said scanning mirror.

11. The apparatus as set forth in claim 8, wherein said image-position controller controls positions of images so that parallax is zero at a center of each of retinas of an observer's eyes associated with a gazing point.

12. A method of three-dimensionally displaying an object, comprising the steps of:
   (a) determining a three-dimensional distance between an observer and an object observed by said observer, based on information about parallax of said object and an interval between cameras, said information about parallax being one of image information which is stereo-recorded with said interval and certain convergence, and is displayed in said observer's eyes;

(b) dividing said three-dimensional distance by a distance between said observer's eyes to thereby determine convergence which is to be generated when an observer looks at said object; and (c) controlling positions of images cast on said observer's eyes so that convergence becomes equal to said convergence having been determined in said steps (b).

13. A method of three-dimensionally displaying an object, comprising the steps of:

(a) detecting a direction on which an observer turns at least one eye to thereby identify a display area at which said observer gazes;

(b) calculating a three-dimensional positional relation between said observer and an object to be observed, existing in said display area;

(c) controlling positions of images so that said object is displayed in said display area at locations on lines connecting said object located at a three-dimensional position calculated in said step (b), to centers of pupils of said observer; and (d) wherein a part of a displayable area is indicated as said display area in said step (a), and an area in said displayable area other than the thus indicated display area is disallowed to be displayed.

14. The method as set forth in claim 13, wherein said area is located internally of an area in which there is displayed an image associated with convergence obtained when said observer looks at a point at infinity.

15. The method as set forth in claim 13, wherein said display area is moved by inserting blank signals into original images at a right edge of said third area for a right eye of said observer and at a left edge of said third area for a left eye of said observer, said blank signals corresponding to an amount of horizontally moving pixel.

16. A method of three-dimensionally displaying an object, comprising the steps of:

(a) detecting a direction on which an observer turns at least one eye to thereby identify a display area at which said observer gazes;

(b) calculating a three-dimensional positional relation between said observer and an object to be observed, existing in said display area;

(c) controlling positions of images so that said object is displayed in said display area at locations on lines connecting said object located at a three-dimensional position calculated in said step (b), to centers of pupils of said observer; and (d) wherein said positions of images are controlled so that parallax is zero at a center of each of retinas of an observer's eyes associated with a gazing point.

17. A method of three-dimensionally displaying an object, comprising the steps of:

(a) detecting a direction on which an observer turns at least one eye to thereby identify a display area at which said observer gazes;

(b) calculating a three-dimensional positional relation between said observer and an object to be observed, existing in said display area;

(c) controlling positions of images so that said object is displayed in said display area at locations on lines connecting said object located at a three-dimensional position calculated in said step (b), to centers of pupils of said observer; and (d) generating a difference between first timing at which beam scanning is started and second timing at which images start being displayed, in accordance with a degree of convergence, and varying positions of images in accordance with the thus generated convergence.

* * * * *